(12) United States Patent
Lönn

(10) Patent No.: US 7,734,673 B2
(45) Date of Patent: Jun. 8, 2010

(54) CONTROL DEVICE OPTIMIZING COMPUTING INPUT SAMPLE OF DATA WITH DISCRETE FOURIER TRANSFORM ALGORITHM

(75) Inventor: Markus Lönn, Vaasa (FI)

(73) Assignee: ABB Oy, Helsinki (FI)

( * ) Notice: Subject to any disclaimer, the term of this patent is extended or adjusted under 35 U.S.C. 154(b) by 957 days.

(21) Appl. No.: 10/587,142

(22) PCT Filed: Jan. 21, 2005

(86) PCT No.: PCT/FI2005/000046
§ 371 (c)(1),
(2), (4) Date: Jul. 24, 2006

(87) PCT Pub. No.: WO2005/071503
PCT Pub. Date: Aug. 4, 2005

(65) Prior Publication Data
US 2007/0055722 A1    Mar. 8, 2007

(30) Foreign Application Priority Data
Jan. 23, 2004    (FI) .................................. 20040100

(51) Int. Cl.
*G06F 15/00* (2006.01)
(52) U.S. Cl. ..................................................... 708/405
(58) Field of Classification Search .......... 708/400–409
See application file for complete search history.

(56) References Cited
U.S. PATENT DOCUMENTS
3,634,668 A    1/1972    Shaffer

| 4,156,920 A | 5/1979 | Winograd |
| 4,715,000 A | 12/1987 | Premerlani |
| 5,172,329 A | 12/1992 | Rahman et al. |
| 6,006,170 A | 12/1999 | Marcantonio et al. |
| 2005/0113819 A1 * | 5/2005 | Wham et al. .................. 606/34 |

OTHER PUBLICATIONS

Official Action issued by the Finnish Patent Office on Aug. 23, 2004 in Corresponding Finnish Patent Application No. 20040100.

(Continued)

*Primary Examiner*—Tan V Mai
(74) *Attorney, Agent, or Firm*—Buchanan Ingersoll & Rooney PC

(57) ABSTRACT

An automatic control device having an input for inputting measured values of cyclic voltage and/or current; computing device for computing a parameter based on said values of voltage and/or current, and for comparing the computed parameter against a predefined condition; and initiating device for initiating a control function in response to the parameter meeting the predefined condition. The input of the control device is arranged to input a predefined number of samples per one cycle; and the computing device is arranged to compute the parameter with a discrete Fourier transform algorithm optimized based on fixed coefficients related to the predefined number of samples per cycle. An exemplary control device and corresponding control method can provide a significantly faster response time than the earlier general programmed solutions without increasing the related costs as much as the known digital signal processors.

17 Claims, 2 Drawing Sheets

OTHER PUBLICATIONS

Luh, P.B., et al., *"Architectural Design of Neural Network Hardware for Job Shop Scheduling"*, Annals of the CIRP, Jan. 1999, pp. 373-376, vol. 48, Elsevier.

Rahman, Md. Hafijur, et al., *"Power, Speed and Area Optimization of FFT Processors"*, CSE 450: Design and Analysis of Algorithms, p. 173, [Online] 2003, http://www.eas.asu.edu/~cse450sp/projects/final_P173.doc.

Press, William H., et al., *"Numerical Recipes in C"*, The Art of Scientific Computing Second Edition, 1992, pp. 26-27, Cambridge University Press, NY, USA.

Downs, Andrew, *"Code Optimization"*, MacTech, 1999, vol. 15, No. 4, XPlain Corporation, CA, USA.

Communication Pursuant to Article 96(2) EPC in English, issued Apr. 30, 2007 in corresponding European Patent Application No. 05 708 130.9, EPO, Munich, DE (cover sheet and pp. 1-5).

* cited by examiner

CONTROL DEVICE OPTIMIZING COMPUTING INPUT SAMPLE OF DATA WITH DISCRETE FOURIER TRANSFORM ALGORITHM

The present application claims priority under 35 USC §119 to Finnish Patent Application Number 20040100, filed Jan. 23, 2004, the disclosure of which is hereby incorporated by reference in its entirety.

FIELD OF THE INVENTION

The present invention relates to automatic control methods, and more particularly to a method for automatic controlling and an automatic control device.

BACKGROUND OF THE INVENTION

Control devices exercise a restraining or directing influence over a controllable device. During its operation an automatic control device typically receives one or more input parameters and in response to the received input parameters outputs one or more control functions. Control functions are further input to a controllable device and they bring about an effect on the operation of the controllable device. One control device may control several controllable devices and one controllable device may be controlled by one or more control devices. The input parameters of the control device may originate from a process of which the controllable device is a part, or they may be fed into the control process from outside, for example as control commands or as output parameters from another process.

In automatic control devices the input parameters are typically derived from a series of sampled data. The document NUMERICAL RECIPES IN C: THE ART OF SCIENTIFIC COMPUTING (ISBN 0-521-43108-5) copyright © 1988-1992 by Cambridge University Press, pp. 496-510, provides the basic principles of Fast Fourier Transform and the referred pages are incorporated herein by reference.

The computation is based on the perception that a physical process can be described in the time domain by the values of some quantity h as a function of time t, or in the frequency domain where the process is specified by giving its amplitude H as a function of frequency f. These two representations can be related to another by means of the Fourier transform equations:

$$H(f) = \int_{-\infty}^{\infty} h(t)e^{2\pi i ft} dt \quad (1)$$

$$h(t) = \int_{-\infty}^{\infty} H(f)e^{-2\pi i ft} df$$

In the most typical situations, function h(t) is sampled at evenly spaced intervals in time, so that the sequence of n sampled values $h_n$ is $$h_n = h(n\Delta) \; n = \ldots, -3, -2, -1, 0.1, 2, 3, \ldots \quad (2)$$

where $\Delta$ is the sampling rate. The integral of equation (1) can be approximated by a discrete sum $$H(f_n) = \int_{-\infty}^{\infty} h(t)e^{2\pi i f_n t} dt \quad (3)$$

$$\approx \sum_{k=0}^{N-1} h_k e^{2\pi i f_n t_k} \Delta$$

$$= \Delta \sum_{k=0}^{N-1} h_k e^{2\pi i k n/N}$$

whereby $$H(f_n) \approx \Delta H_n \quad (4)$$

when $$H_n \equiv \sum_{k=0}^{N-1} h_k e^{2\pi i k n/N} \quad (5)$$

In practical solutions the computing related to Discrete Fourier Transform is significantly reduced by utilising Fast Fourier Transform (FFT) algorithm. In the first section of FFT, the data is first sorted into bit-reversed order. The second section of FFT has an outer loop that is executed $\log_2 N$ times and calculates, in turn, transform of length 2, 4, ..., N. For each stage of the process the two nested inner loops range over the sub-transforms already computed and the elements of each transform, implementing the Danielson-Lanczos Lemma. This variant of the FFT is called a decimation-in-time or Cooley-Tukey FFT algorithm. The decimation-in-frequency (Sande-Tukey) FFT algorithm first goes through a set of $\log_2 N$ iterations on the input data, and then rearranges the output values into bit-reverse order.

In another class of FFT variants the initial data set of N is sub-divided down to some small power of 2, for example N=4 (base-4 FFT) or N=8 (base-8 FFT). These small transforms are done by small sections of optimized coding that utilize special symmetries of the particular N. Assuming, for example, that N=4, leads to the trigonometric sines and cosines being 0, +1 or −1, which by far eliminates multiplications, and leaves additions and subtractions. Base-4 or base-8 FFTs have been considered to decrease the computing of the order to 20 to 30 percent.

One example of automatic control devices is an electric protection device. The general purpose of electric protection devices is to prevent or limit damage to the protected device or to protect service of the protected device from interruption. In electric circuits the current flows are rapidly varied and the power may surge instantaneously. Therefore the power feed of an electrically driven device is always provided with one or more protection functions that are capable of isolating the device from harmful electrical transients from the power feed. In more elementary devices the protection devices are typically relay arrangements that are triggered when present current or voltage levels exceed a pre-determined threshold. In more complex systems the current and voltage levels are rigorously monitored and protection functions responsive to various parameters acquired through monitoring are utilized to safeguard the system from harmful effects in the power system.

In general electrical devices are designed to function with sinusoidal voltage, and for accurate functionality highly developed systems also require a faultless voltage to function correctly. One of the main harmful effects deteriorating the quality of electricity in the power systems are the harmonics. Harmonics are divided into different components by their properties (ranking number). The component class shows the rotational direction of the phase phasor of the harmonic with respect to the fundamental frequency.

When the curve form of the voltage or of the current deviates from the sinusoidal, it can be considered formed of several sinusoidal signals of different frequency. The function is typically broken down into its components by using the above Fourier analysis, on which the mathematical treatment of harmonics is based.

In complex protection devices the method of determining a protection function based on said input parameters generally comprises balancing between the expenses of the device and the response time from receiving the input parameters to outputting the determined protection function. In known protection devices a digital signal processor (DSP) is considered the most powerful tool for handling defined input signals and for determining a protection function thereupon. However, the component costs related to digital signal processors are considerable, and in a complex system the costs due to the number of digital signal processors need to be optimised.

On the other hand, the embedded systems facilitate parallel usage of a variety of programmable algorithms. A number of variable algorithms are available and component costs are not directly increased with the number of operable protection functions. However, going through the number of calculations takes time and the accumulated response times become longer than what is actually required in order to implement the protection functions appropriately. There are a number of cases where the acceptable response times are only slightly exceeded, but for reliability reasons the costly DSP very often end up being preferred over the programmable algorithms.

Consequently, one of the disadvantages associated with the known electric protection devices is that the available means for determining protection functions in response to various input values do not facilitate adequate optimization that takes into consideration both the technical and economical factors related to operable protection functions.

BRIEF DESCRIPTION [DISCLOSURE] OF THE INVENTION

An object of the present invention is thus to provide a method and an apparatus for implementing the method so as to alleviate the above disadvantage. The objects of the invention are achieved by a method and a control device which are characterized by what is stated in the independent claims. The preferred embodiments of the invention are disclosed in the dependent claims.

The invention is based on the idea of appropriately fixing the number of sampled current and/or voltage data and optimizing the discrete Fourier transform algorithm based on operations on the fixed coefficients.

An advantage of the method and arrangement of the invention is that it provides significantly shorter response time than the earlier general programmed solutions without increasing the related costs as much as the conventional digital signal processors, and therefore enables more flexible optimization between technical and economical factors in an electric protection device.

BRIEF DESCRIPTION OF THE DRAWINGS

In the following the invention will be described in greater detail by means of preferred embodiments with reference to the attached drawings, in which.

DETAILED DESCRIPTION OF THE INVENTION

As an embodiment of a control device according to the present invention, the invention is described in the following by means of an electric protection device of an electric motor. Naturally, it is obvious to a person skilled in the art that said solution is applicable to any control device arranged to monitor the quality of power supply on a basis of series of measured values of current and/or voltage, and on the basis of the measured values to implement a control function to control the operation of a device connected to said power supply.

Figure 1:
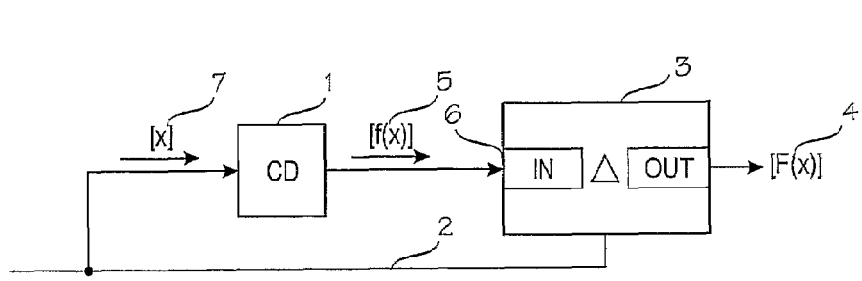
FIG. 1 is a block chart illustrating the operating environment of a control device according to the present invention.

FIG. 1 is a block chart illustrating the operating environment of a control device according to the present invention. The control device 1 is connected to an electric line 2 feeding an electrically operated device 3, whose purpose is to perform an operation functionality F(x) 4. The operation functionality 4 may be a continuous operation that is continuously controlled by control function f(x) 5 input through a control input 6, or the operation functionality 4 may be a step function triggered by sequential control functions f(x) 5 input through said control input 6, or a combination of both. It should be noted that only essential elements for illustrating the operating environment of the control device according to the invention are shown in FIG. 1. For a person skilled in the art it is clear, for example, that a complex system typically comprises a plurality of inputs and outputs like the one shown in FIG. 1.

During its operation the control device 1 typically receives input data (x) 7 and in response to the received data 7 outputs one or more control functions f(x) 5. The input data 7 that is input to the control device 1 may originate from a process of which the controllable device 3 is a part, or it may be fed into the control process from outside, for example as control commands or as parameters output from another process. In this first embodiment the input data x 7 comprises sequentially measured values of current in a power feed of an electric motor, hereinafter called as sampled current values.

In computing the basic algorithm of a discrete Fourier transformation can be expressed as:

```
void dft(double *x, double *re, double *im, int N) {
    int k, n;
    double a;
    for (k = 0; k < N; k++) {
        re[k] = 0;
        im[k] = 0;
        for (n = 0; n < N; n++) {
            a = k * n * PI2 / N;
            re[k] += x[n] * cos(a);
            im[k] -= x[n] * sin(a);
        }
    }
}
``` where x=sampled data re=real values of transformation im=imaginary values of transformation N=number of samples PI2=2*pi The current levels of the power feed are measured sequentially and the measured values are arranged into an array of N samples. The sample rate R is adjusted to the nominal frequency f of the power feed so that R=fN. In this first embodiment of the present invention the number of samples is adjusted to 32, and with the nominal frequency of 50 Hz, the sample rate is 1,6 kHz.

By adjusting the number of samples N to a value in power of 2, the sine and cosine functions have a corresponding range of N/4 possible non-zero absolute values. In this first embodiment of the present invention the sample rate of 32 leads to eight different non-zero values for the sine and cosine functions.

$$r[0] = \cos(1 * pi / 16)$$
$$r[1] = \cos(2 * pi / 16)$$
$$r[2] = \cos(3 * pi / 16)$$
$$...$$

In increasing computing speeds integer values are typically preferred, and therefore computed values can be scaled into an integer form with a fast shift-operation. In this first embodiment the sine and cosine functions are scaled into integer form using factor $2^{14}$ (16384), whereby an array of $$r[0] = \cos(1 * pi / 16) * 16384$$
$$r[1] = \cos(2 * pi / 16) * 16384$$
$$r[2] = \cos(3 * pi / 16) * 16384$$
$$...$$
$$r[7] = \cos(7 * pi / 16) * 16384$$

is formed. Thereafter the basic algorithm is optimized on the basis of comprehensive consideration of the coefficients r. Said optimization comprises eliminating the time-consuming calculations for the trigonometric functions, where the operations comprising multiplication by zero are discarded, and multiplications by −1 or +1 are eliminated by merely changing or retaining the sign of the sampled values. Said optimization preferably comprises also locating individual equations including a common factor r and consolidating the equations into multiplication by combined sums. The rows of the basic algorithm are optimally reduced and consolidated to the extent that identical operations need to be performed only once.

In this first embodiment of the present invention the optimized Fourier transformation of the array of 32 x-values can be expressed in C language format as:

```
#define SHIFT 14
void ft32(int *x)
{
  unsigned char i, j;
  int k[7] = {16069, 15137, 13623, 11585, 9102, 6270, 3196};
  int a[16], b[16], c[8], d[8], e[8], f[8], g[57];
  for(i = 0; i < 16; i++)
  {
    j = i + 16;
    a[i] = x[i] + x[j];
    b[i] = x[i] − x[j];
  }
  c[0] = a[0] + a[8];
  d[0] = a[0] − a[8];
  for(i = 1; i < 8; i++)
  {
    j = 16 − i;
    c[i] = a[i] + a[j];
```

-continued

```
    d[i] = a[i] − a[j];
    e[i] = b[i] + b[j];
    f[i] = b[i] − b[j];
  }
  g[0] = c[0] + c[4];
  g[1] = c[2] + c[6];
  g[2] = c[1] + c[3] + c[5] + c[7];
  g[3] = k[0] * f[1] >> SHIFT;
  g[4] = k[0] * e[7] >> SHIFT;
  g[5] = k[0] * f[5] >> SHIFT;
  g[6] = k[0] * e[3] >> SHIFT;
  g[7] = k[0] * f[3] >> SHIFT;
  g[8] = k[0] * e[5] >> SHIFT;
  g[9] = k[0] * f[7] >> SHIFT;
  g[10] = k[0] * e[1] >> SHIFT;
  g[11] = k[1] * f[2] >> SHIFT;
  g[12] = k[1] * e[6] >> SHIFT;
  g[13] = k[1] * f[6] >> SHIFT;
  g[14] = k[1] * e[2] >> SHIFT;
  g[15] = k[1] * (c[1] − c[7]) >> SHIFT;
  g[16] = k[1] * (d[3] + d[5]) >> SHIFT;
  g[17] = k[1] * (c[3] − c[5]) >> SHIFT;
  g[18] = k[1] * (d[1] + d[7]) >> SHIFT;
  g[19] = k[2] * f[3] >> SHIFT;
  g[20] = k[2] * e[5] >> SHIFT;
  g[21] = k[2] * f[1] >> SHIFT;
  g[22] = k[2] * e[7] >> SHIFT;
  g[23] = k[2] * f[7] >> SHIFT;
  g[24] = k[2] * e[1] >> SHIFT;
  g[25] = k[2] * f[5] >> SHIFT;
  g[26] = k[2] * e[3] >> SHIFT;
  g[27] = k[3] * f[4] >> SHIFT;
  g[28] = k[3] * e[4] >> SHIFT;
  g[29] = k[3] * (c[2] − c[6]) >> SHIFT;
  g[30] = k[3] * (d[2] + d[6]) >> SHIFT;
  g[31] = k[3] * (c[1] − c[3] − c[5] + c[7]) >> SHIFT;
  g[32] = k[3] * (d[1] + d[3] − d[5] − d[7]) >> SHIFT;
  g[33] = k[4] * f[5] >> SHIFT;
  g[34] = k[4] * e[3] >> SHIFT;
  g[35] = k[4] * f[7] >> SHIFT;
  g[36] = k[4] * e[1] >> SHIFT;
  g[37] = k[4] * f[1] >> SHIFT;
  g[38] = k[4] * e[7] >> SHIFT;
  g[39] = k[4] * f[3] >> SHIFT;
  g[40] = k[4] * e[5] >> SHIFT;
  g[41] = k[5] * f[6] >> SHIFT;
  g[42] = k[5] * e[2] >> SHIFT;
  g[43] = k[5] * f[2] >> SHIFT;
  g[44] = k[5] * e[6] >> SHIFT;
  g[45] = k[5] * (c[3] − c[5]) >> SHIFT;
  g[46] = k[5] * (d[1] + d[7]) >> SHIFT;
  g[47] = k[5] * (c[1] − c[7]) >> SHIFT;
  g[48] = k[5] * (d[3] + d[5]) >> SHIFT;
  g[49] = k[6] * f[7] >> SHIFT;
  g[50] = k[6] * e[1] >> SHIFT;
  g[51] = k[6] * f[3] >> SHIFT;
  g[52] = k[6] * e[5] >> SHIFT;
  g[53] = k[6] * f[5] >> SHIFT;
  g[54] = k[6] * e[3] >> SHIFT;
  g[55] = k[6] * f[1] >> SHIFT;
  g[56] = k[6] * e[7] >> SHIFT;
  x[0] = g[0] + g[1] + g[2];
  x[1] = 0;
  x[2] = b[0] + g[3] + g[11] + g[19] + g[27] + g[33] + g[41] + g[49];
  x[3] = −b[8] − g[50] − g[42] − g[34] − g[28] − g[20] − g[12] − g[4];
  x[4] = d[0] + g[15] + g[29] + g[45];
  x[5] = −d[4] − g[46] − g[30] − g[16];
  x[6] = b[0] + g[21] + g[43] − g[51] − g[27] − g[5] − g[13] − g[35];
  x[7] = b[8] − g[36] − g[14] − g[6] − g[28] − g[52] + g[44] + g[22];
  x[8] = c[0] − c[4] + g[31];
  x[9] = d[6] − d[2] − g[32];
  x[10] = b[0] + g[37] − g[43] − g[7] − g[27] + g[53] + g[13] + g[23];
  x[11] = g[8] − b[8] − g[24] − g[14] − g[54] + g[28] + g[44] − g[38];
  x[12] = d[0] + g[47] − g[29] − g[17];
  x[13] = d[4] − g[18] − g[30] + g[48];
  x[14] = b[0] + g[55] − g[11] − g[39] + g[27] + g[25] − g[41] − g[9];
  x[15] = b[8] − g[10] − g[42] + g[26] + g[28] − g[40] − g[12] + g[56];
  x[16] = g[0] − g[1];
  x[17] = d[3] − d[1] − d[5] + d[7];
```

-continued

```
x[18] = b[0] - g[55] - g[11] + g[39] + g[27] - g[25] - g[41] + g[9];
x[19] = g[12] - b[8] - g[10] + g[42] + g[26] - g[28] - g[40] + g[56];
x[20] = d[0] - g[47] - g[29] + g[17];
x[21] = g[48] - d[4] - g[18] + g[30];
x[22] = b[0] - g[37] - g[43] + g[7] - g[27] - g[53] + g[13] - g[23];
x[23] = b[8] - g[24] + g[14] - g[54] - g[28] + g[8] - g[44] - g[38];
x[24] = c[0] - c[4] - g[31];
x[25] = d[2] - d[6] - g[32];
x[26] = b[0] - g[21] + g[43] + g[51] - g[27] + g[5] - g[13] + g[35];
x[27] = g[14] - b[8] - g[36] - g[6] + g[28] - g[52] - g[44] + g[22];
x[28] = d[0] - g[15] + g[29] + g[45];
x[29] = d[4] - g[46] + g[30] - g[16];
x[30] = b[0] - g[3] + g[11] - g[19] + g[27] - g[33] + g[41] - g[49];
x[31] = b[8] - g[50] + g[42] - g[34] + g[28] - g[20] + g[12] - g[4];
}
```

The embodiment shows further that the results of the optimized Fourier transformation are stored into the original array of x-values as follows:

$x[0] = I_0\text{re}(\text{DC})$  $x[1] = I_0\text{im}(=0)$ $x[2] = I_1\text{re}$  $x[3] = I_1\text{im}$ $x[4] = I_2\text{re}$  $x[5] = I_2\text{im}$

...

$x[30] = I_{15}\text{re}$  $x[31] = I_{15}\text{im}$ thereby comprising the DC-component and real and imaginary values of 15 harmonic components. This optimizes the use of memory, because no new arrays need to be created to store the real and imaginary values of the harmonic components. Furthermore, the choice of using 32 samples per cycle has been detected to be an optimal choice because this way it provides reasonable accuracy in computation of up to 15 harmonic components with reasonable amount of computable samples.

The real values of harmonic components $I_{17} \ldots I_{31}$ are equal to the real values of harmonic components $I_{15} \ldots I_1$, correspondingly, and the imaginary values of harmonic components $I_{17} \ldots I_{31}$ are opposite to the imaginary values of harmonic components $I_{15} \ldots I_1$, correspondingly, whereby the absolute values of harmonic components $I_{17} \ldots I_{31}$ are equal to the absolute values of harmonic components $I_{15} \ldots I_1$, correspondingly. For further optimization, calculation of real and imaginary values of harmonic components $I_{17} \ldots I_{31}$ of the basic algorithm can therefore be omitted.

With the above optimized algorithm the computation of the harmonic components is significantly faster and causes considerably less load to the processor. In the above description the calculation of real and imaginary values of harmonic components of current are shown, but the same algorithm can be applied to the measured values of voltage as well. The computed real and imaginary values of harmonic components of current and voltage can be used to calculate a variety of important parameters to which the control functions of the control device may be made responsive. In this embodiment of the present invention the root-mean-square current can be calculated from the computed values by $$I_{RMS} = \sqrt{\frac{\sum_{i=1}^{n}(I_i\text{re}^2 + I_i\text{im}^2)}{512}} \qquad (6)$$

where n is the number of harmonic components.

Correspondingly the power factor can be calculated from the computed values of the first harmonic by $$\cos(phi) = \frac{I_1\text{re}*U_1\text{re} + I_1\text{im}*U_1\text{im}}{I_1*U_1}, \qquad (7)$$

where $I_1$ and $U_1$ denote the lengths of the current and voltage vectors, correspondingly.

By calculating the sign from $$\text{sign} = I_1\text{re}*U_1\text{im} - I_1\text{im}*U_1\text{re} \qquad (8)$$

enables determining the phase angle of the power feed, and thereby whether the coupling is capacitive or inductive. If the sign is positive (sign>0), the phase angle is lagging, and the connection is inductive. If the sign is negative (sign<0), the phase angle is leading, and a capacitive connection is involved.

Furthermore, the distortion can be calculated from the computed values by $$THD = \sqrt{\sum_{i=2}^{n}\left(\frac{U_i}{U_1}\right)^2} \qquad (9)$$

The apparent power of three phases can be derived from $$S = I1_{RMS}*U1_{RMS} + I2_{RMS}*U2_{RMS} + I3_{RMS}*U3_{RMS}$$

$$P = |\cos(phi)|*S \qquad (10)$$

where
 $I1_{RMS}$ is the root mean square current of phase 1
 $I2_{RMS}$ is the root mean square current of phase 2
 $I3_{RMS}$ is the root mean square current of phase 3
 $U1_{RMS}$ is the root mean square voltage of phase 1
 $U2_{RMS}$ is the root mean square voltage of phase 2
 $U3_{RMS}$ is the root mean square voltage of phase 3 and the earth fault current can be calculated from $$I_0 = \sqrt{\frac{(I1_1\text{re} + I2_1\text{re} + I3_1\text{re})^2 + (I1_1\text{im} + I2_1\text{im} + I3_1\text{im})^2}{512}}. \qquad (11)$$

Figure 2:
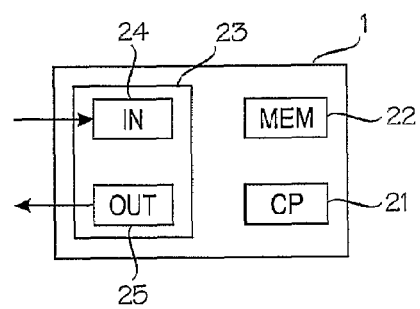
FIG. 2 illustrates schematically the basic functional structure of a control device 1 according to the first embodiment of the present invention illustrated in FIG. 1.

FIG. 2 illustrates schematically the basic functional structure of a control device 1 according to the first embodiment of the present invention illustrated in FIG. 1. The control device includes processing means 21, an element that comprises an arithmetic logic unit, a number of special registers and control circuits. Connected to the processing means there are memory means 22, data medium where computer-readable data or programs, and/or static or dynamic data can be stored. The memory means typically comprise memory units that allow both reading and writing (RAM), and memory whose content can only be read (ROM). The unit also comprises an interface block 23 with input means 24 for inputting data for internal processing in the unit, and output means 25 for outputting data from the internal processes of the unit. Examples of said input means comprise a plug-in unit acting as a gateway for the information delivered to its external connection points, a keypad, or a touch screen, a microphone, or the like. Examples of said output means comprise a plug-in unit feeding information to the lines connected to its external connection points, a screen, a touch screen, a loudspeaker, or the like. The processing means 21, memory means 22, and interface block 23 are electrically interconnected for performing systematic execution of operations on received and/or stored data according to the predefined, essentially programmed processes of the unit.

In the first embodiment the predefined processes comprise a programmed algorithm that on the basis of the sequentially sampled current levels computes a plurality of parameters representative of the quality of the power feed to the electric motor. Said processes also comprise a number of protection functions that, responsive to the computed values, initiate, adjust and/or terminate a variety of control operations. The algorithm is optimized for improved response time and saved processor capacity. The input means 24 comprise an input to sensors that with a defined sample rate measure current and voltage values of the power feed, the signals from the sensors being first processed from analog to digital format with an analog-to-digital converter. The input means 24 typically comprise also an interface to an on-site user terminal and/or to the fieldbus for on-site and/or remote controlling of the device. The output means 25 comprise primarily an output to a relay through which the electric motor can be isolated from the power feed whenever one of the monitored parameters passes through a predefined threshold level. The output means 25 typically comprise also an interface to an on-site user terminal and/or to the fieldbus for on-site and/or remote processing of the information on the processes in the device.

Figure 3:
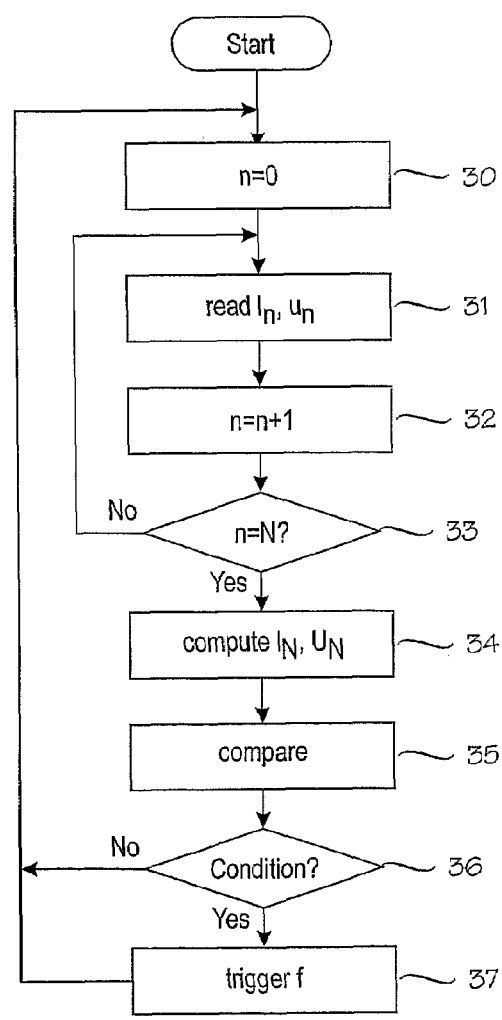
FIG. 3 is a flow chart illustrating a method of automatic control according to the present invention.

FIG. 3 is a flow chart illustrating a method of automatic control according to the first embodiment of the present invention. In step 30 a counter for counting the number of data samples is reset to zero, and in step 32 the measured values of current and voltage in digital form are collected. In step 33 the counter is incremented and the current value of the counter is compared with the predefined number of data samples N in step 33. If the counter indicates that there are less samples than the predefined number of data samples N, the process returns to step 31 where next values of current and voltage are read. Otherwise the predefined number of data samples have been read and will be analyzed with the algorithm optimized as described above. In step 34 a predefined number of real and imaginary values of harmonic components are calculated from the sampled values of current and voltage, and relevant characteristics of the power feed, including for example root-mean-square current, the power factor, distortion, or earth fault current are determined therefrom. In step 35 the determined values are compared against corresponding threshold conditions. If none of the threshold conditions are met (step 36), the process may continue automatically and no control function needs to be triggered. If a threshold condition is met, the procedure will move to step 37 where a control function f is triggered. The control function itself is not relevant to the invention and will not be described in more detail. The procedure thus returns to step 30 where the counter is reset to zero in order to collect a new set of samples. It should be noted that the current and voltage levels are measured continuously, and therefore the procedure typically contains buffering of values to facilitate an appropriate reciprocity between the reading and computing operations. However, due to the optimized algorithm the delay from computing is minimized.

In the above described first embodiment of the present invention the control function is a protection function whereby the controllable device is isolated from the power feed whenever one of the defined electrical characteristics of the power feed exceeds a predefined level. The electrical characteristics of the power feed are determined from sequences of measured values of current and voltage using the optimized computation algorithm. It is clear for a person skilled in the art that said control function can be any restraining or directing operation performed to affect the controllable device. The control function may comprise, for example, sending an alarm signal to a central control device through the fieldbus, or providing a feedback signal to adjust the operation of the power source.

Figure 4:
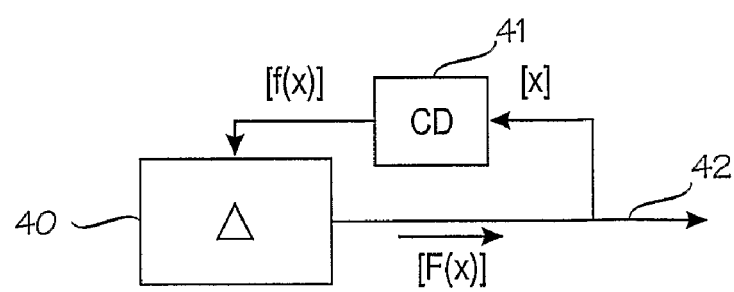
FIG. 4 illustrates another embodiment of the invention.

FIG. 4 illustrates another embodiment of the invention where the controllable device 40 is the power feed itself, for example an electric generator. Electric generators are known to persons skilled in the art and as such will not be described here in more detail. The operation of the power source is controlled by a control device 41 connected to it. The control device 41 is an assembly of variable control functions, ranging from simple mechanical switches, functions performed with on-site user interface terminals, automated control functions performed through the fieldbus system, to automatic control operations performed with powerful digital signal processors. The control device 41 according to the present invention is connected to the power line 42 to receive information on the generated power F(x) as a sequence of measured current and voltage levels, and on the basis of the sampled data to compute a group of defined parameters representing the characteristics of the quality of the power feed. In case said parameters indicate an unwanted effect, a corrective control function is initiated.

The optimization of the algorithm is based on primarily fixing the number of data samples per cycle to be processed with the Discrete Fourier Transform. The optimized algorithm thus corresponds to a defined sample rate, and thus to a defined nominal frequency. In case the nominal frequency is changed, the sample rate needs to be adjusted to provide the predefined number of samples within the cycle of the new nominal frequency.

In the above first embodiment the DC-component and real and imaginary values of 15 harmonic components are computed. The number of harmonic components to be calculated can be adjusted depending on the level of required accuracy. The smaller the number of components, the less time will be needed for computing, but at the same time the accuracy of the result will reduce.

Therefore, an automatic control device comprises optimally a number of variable control devices chosen and adjusted according to the parameters relevant to each individual control operation. The control device according to the present invention provides a solution where the response time of an economical configuration is improved, and can even be adjusted, and which therefore provides for optimization that takes into consideration both the technical and economical factors related to operable protection functions. The optimal arrangement of individual control devices can thus be configured according to the current operating environment to provide the necessary actions in appropriate times with economical efficiency.

It will be obvious to a person skilled in the art that, as technology advances, the inventive concept can be implemented in various ways. The invention and its embodiments are not limited to the examples described above but may vary within the scope of the claims.

The invention claimed is:

1. An automatic control device, comprising
input means for inputting samples comprising measured values of cyclic voltage and/or current;
computing means for computing a parameter on the basis of said samples, and for comparing the computed parameter to a predefined condition; and
initiating means for initiating a control function in response to the parameter meeting the predefined condition;
said input means being arranged to input a predefined number N of samples per one cycle; and said predefined number N being a power of two;
said computing means being arranged to compute the parameter with a discrete Fourier transform algorithm optimized on the basis of fixed coefficients that correspond to said predefined number N of samples per cycle, the optimization on the basis of fixed coefficients comprising:
determining for the discrete Fourier transform algorithm a group of discrete values each discrete value being a result of multiplication with a coefficient that varies according to a sine or cosine function of an integer value multiplied with a quotient of full cycle and said predefined number N of samples per one cycle, the integer value ranging up to the predefined number N of samples per one cycle;
determining zero coefficients that by the choice of said predefined number N of samples per one cycle fix to zero;
determining multiplication coefficients the value of which by the choice of said predefined number N of samples per one cycle fix to 1 or −1;
eliminating calculations involving zero coefficients; and
replacing calculations involving multiplication coefficients by use of corresponding minus and plus signs.

2. An automatic control device as claimed in claim 1, wherein said predefined number is 32.

3. An automatic control device as claimed in claim 1, wherein in said optimized Fourier transform algorithm two or more multiplications by a fixed coefficient have been combined into a sum equation.

4. An automatic control device as claimed in claim 1, wherein in said optimized Fourier transform algorithm samples and coefficients are brought to integer form by multiplication by a value that is fourteenth power or higher of two.

5. An automatic control device as claimed in claim 1, wherein said computing means are arranged to compute a parameter that is one of the following: root-mean-square current, power factor, power factor indication on a capacitive or inductive nature of a coupling, distortion, and earth fault current.

6. An automatic control device as claimed in claim 1, wherein the automatic control device is an electric protection device and said control function comprises isolation of a second device from an electric line.

7. An automatic control device as claimed in claim 1, wherein the automatic control device is connected to a generator feeding an electric line and said control function comprises adjustment of the operation of said generator.

8. An automatic control device as claimed in claim 1, wherein in said optimized Fourier transform algorithm calculations involving coefficients fixed to zero have been eliminated.

9. An automatic control device as claimed in claim 8, wherein in said optimized Fourier transform algorithm multiplication by fixed coefficients 1 or −1 are avoided by use of signs.

10. An automatic control device as claimed in claim 9, wherein in said optimized Fourier transform algorithm two or more multiplications by a fixed coefficient have been combined into a sum equation.

11. An automatic control device as claimed in claim 10, wherein in said optimized Fourier transform algorithm samples and coefficients are brought to integer form by multiplication by a value that is fourteenth power or higher of two.

12. An automatic control device as claimed in claim 11, wherein said computing means are arranged to compute a parameter that is one of the following: root-mean-square current, power factor, power factor sign, distortion, and earth fault current.

13. An automatic control device as claimed in claim 12, wherein the automatic control device is an electric protection device and said control function comprises isolation of a second device from the electric line.

14. An automatic control device as claimed in claim 13, wherein the automatic control device is connected to a generator feeding the electric line and said control function comprises adjustment of the operation of said generator.

15. A method for automatic control of an electrically operated device, comprising:
inputting a predefined number of samples comprising measured values of cyclic voltage and/or current;
computing a parameter on the basis of said samples;
comparing the computed parameter against a predefined condition;
initiating a control function in response to the parameter meeting the predefined condition;
fixing the number N of samples input per one cycle, the number N being a power of two; and
computing the parameter with a discrete Fourier transform algorithm optimized on the basis of fixed coefficients that correspond to said fixed number N of samples per cycle,
the optimization on the basis of fixed coefficients derived by:
determining for the discrete Fourier transform algorithm a group of discrete values, each discrete value being a result of multiplication with a coefficient that varies according to a sine or cosine function of an integer value multiplied with a quotient of full cycle and said predefined number N of samples per one cycle, the integer value ranging up to the predefined number N of samples per one cycle;
determining zero coefficients that by the choice of said predefined number N of samples per one cycle fix to zero;
determining multiplication coefficients the value of which b y the choice of said predefined number N of samples per one cycle fix to 1 or −1;
eliminating calculations involving zero coefficients; and
replacing calculations involving multiplication coefficients by use of corresponding minus and plus signs.

16. A computer program product, executable in a computer, wherein execution of the computer program product in the computer causes the computer to carry out the steps of claim 15.

17. A computer program product according to claim 16, wherein said predefined number is a power of 2.

* * * * *